3,344,126
RESIN CROSS-LINKING IN THE PRESENCE OF AN ORGANIC MONOPEROXYCARBONATE

Eugene D. Witman, Pittsburgh, Pa., assignor to Pittsburgh Plate Glass Company, Pittsburgh, Pa., a corporation of Pennsylvania
No Drawing. Filed June 3, 1963, Ser. No. 284,846
12 Claims. (Cl. 260—79.5)

This invention relates to a process for improving the physical properties of fusible, linear, organic polymers by cross-linking. It especially relates to the cross-linking of elastomeric polymers such as polyethylene, polypropylene, and copolymers of ethylene and propylene.

In the utilization of organic polymers containing residual unsaturation it is often desirable to cross-link or further cure the polymer to increase its molecular weight, thereby modifying physical properties such as solubility. Those polymers containing units derived from a diolefin like butadiene have residual unsaturation in the elastomeric polymer, which unsaturation may be reacted with a cross-linking substance which links together two or more polymeric chains. The classic cross-linking agent for such elastomers is elemental sulfur. Other polymers may be cross-linked by combining other functional groups, such as hydroxy groups, with a difunctional reactive compound, viz, a diisocyanate.

Recently commercial attention has been focused on the saturated elastomers, represented by polyethylene, polypropylene, and copolymers of ethylene and propylene. These saturated polymers are not susceptible to classical methods of cross-linking. However, it is often sufficient to cross-link a small number of elastomeric chains to produce considerable change in physical properties. This is accomplished by such means as irradiation with X-rays, etc., and by incorporation of a reactive chemical substance. Cross-linking results when a free radical attacks an elastomer chain to convert it to a free radical at some point on the chain, usually by abstracting a proton or hydrogen atom. The newly generated elastomeric radical is then available for combination with a second elastomer radical. As a result of this combination one chain having approximately doubled molecular weight is formed. This material has greatly diminished solubility by virtue of its three-dimension character, as well as other modified physical properties such as softening point and increased tensile strength.

Saturated elastomers may be cross-linked by elemental sulfur if an organic peroxide is also included in the formulation. Dicumyl peroxide (Di-Cup) is used for this purpose. It is believed that the peroxide is thermally decomposed to form radicals which attack both sulfur and the saturated polymer chain to form free radicals of both. A portion of these radicals then combine to form increased molecular weight elastomer. Some combined radicals contain sulfur and others do not. When a di(aralkyl) peroxide, such as dicumyl peroxide, is employed for cross-linking, complete cross-linking of the elastomer may be obtained by employing about 30 parts by weight of dicumyl peroxide per hundred of polypropylene. This results in degradation of about 10 parts by weight of the elastomer per hundred parts by weight of original polymer. In U.S. Patent 3,012,016, less than 20 parts by weight of each, sulfur and di(aralkyl) peroxide per hundred parts by weight of polymer, produced polymers having greatly increased tensile strength. Thus, the use of sulfur improves physical properties and decreases chain degradation in saturated polymers when cross-linked by heating with this peroxide. However, these and other advantages are to a very great extent offset and rendered valueless by the simultaneous formation of highly odiferous and obnoxious sulfur derivatives in the polymer.

Now it has been discovered that organic monoperoxycarbonates, notably O,O-tertiarybutyl O-isopropyl monoperoxycarbonate, may be contacted at its activating temperature with fusible linear organic polymer containing at least one

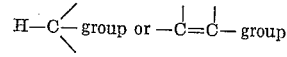

per elastomer chain to produce cross-linked polymer, which is insoluble or at least is less soluble in usual solvents such as benzene.

Such organic monoperoxycarbonates often are effective at temperature below those at which aromatic peroxides, such as dicumyl peroxide, are useful. Thus, they permit cross-linking at lower temperatures and yet function at temperatures sufficiently high to permit processing. Moreover, they produce little or no odor even when used in conjunction with sulfur whereas other peroxides produce a serious odor problem.

This invention may be practiced by mixing solid monoperoxycarbonate with elastomer with or without other curing agents, such as elemental sulfur or sulfur compounds which vulcanize or assist vulcanization of rubber, in a blending machine to produce a substantially uniform mixture at a temperature below that at which significant activation of the monoperoxycarbonate occurs. Thereafter the mixture is heated in a mold or on a hot rubber mill until the active temperature range of the monoperoxycarbonate is reached, whereupon cross-linking is obtained. Other methods of mixing may also be employed, viz, on a cold roller mill ingredients may be milled together until uniform and subsequently heated to cross-link. Alternatively, a solution or suspension of polymer and monoperoxycarbonate may be cast to form a film or coating by evaporation of solvent or suspending liquid, followed by heating at a temperature sufficiently high to produce cross-linking. Moreover, the monoperoxycarbonate may be dispersed in an aqueous latex of the polymer and the latex coagulated to produce a crumb containing the catalyst which may then be processed and cured.

According to a further embodiment, the liquid monoperoxycarbonate may be mixed with finely divided silica pigment or carbon black or other rubber pigment having a surface area above 40 to 50 square meters per gram, to produce an essentially dry pulverulent mixture or powder and the resulting powder may be milled into the rubber.

The resulting mixture is then shaped to a desired form, such as a sheet, a tire, a tube or rod, a heel or shoesole, or the like and then may be heated at a temperature above formation or milling temperature and cured or vulcanized to the so-called cross-linked state.

By utilization of organic monoperoxycarbonates, notably O,O-tertiaryalkyl O-alkyl monoperoxycarbonate, such as O,O-tertiarybutyl O-isopropyl monoperoxycarbonate, elastomers which have improved physical properties, such as insolubility in organic solvents or resistance to crazing by such solvents and/or improved tensile or tear strength or abrasion resistance, are produced. Such production may be achieved at reduced molding or milling temperatures whereby decreased thermal degradation of cross-linked chains takes place.

Sulfur and sulfur-contributing materials, notably thiuram sulfides, may be added to mixtures of natural rubbers or rubber-like butadiene or isoprene polymers or copolymers with the monoperoxycarbonate to produce therefrom innocuous sulfur-containing, cross-linked, rubber-like materials having modified properties, such as decreased solubility in organic solvents. Such modified polymer is produced by heating said mixture to the activation temperature of the monoperoxycarbonate while avoiding the extreme temperatures required by peroxides derived from carboxylic acids for cross-linking and which tend to degrade cross-linked polymer before cross-linking is completed. An especially valuable result of this embodiment is the formation of cross-linked polymer containing sulfur which lacks the vile odor of polymer cross-linked with sulfur and dicumyl peroxide.

Polyethylene is an illustrative polymer which may be cross-linked pursuant to this invention by contact with a monoperoxycarbonate, such as O,O-tertiarybutyl O-isopropyl monoperoxycarbonate, at activation temperature. Other organic polymers derived by polymerizing a material which contains a polymerizable

(where the polymerization proceeds via this polymerizable group) group may be effectively cross-linked. Saturated polymers (i.e., those substantialy free from carbon to carbon unsaturation) are cross-linked with particular effectiveness and include such elastomers as are formed by the polymerization according to recognized polymerization expedients of butene, isobutylene, ethylene, propylene, vinylidene chloride, vinyl chloride, vinyl fluoride, methyl methacrylate, methyl acrylate, styrene, vinyl acetate, and mixtures thereof. Those polymers resulting from polymerization of butadiene, isoprene and chloroprene alone or in admixture with other unsaturated monomers also may be cross-linked or cured.

These polymers also may be cross-linked by contacting with the monoperoxycarbonate, notably O,O-tertiarybutyl O-isopropyl monoperoxycarbonate and a sulfur-contributing material at a temperature above the decomposition temperature of the monoperoxycarbonate and sufficiently high to cause cross-linking to occur. This produces a cross-linked organic polymer, which is insoluble (or is at least much less soluble than the polymer prior to treatment) in the usual solvents, such as benzene, and is devoid of offensive odor such as that odor resulting from the cross-linking of polypropylene with dicumyl peroxide and sulfur.

Organic polymers resulting from polymerization of one or more unsaturated monomers through such unsaturation are cross-linked with particular effectiveness pursuant to this invention at temperatures below those required with diaryl peroxides and sulfur without encountering objectionable odor. Generally, cross-linkable polymers have at least one carbon atom per chain which is susceptible to attack by monoperoxycarbonate. Susceptible polymers include those having a chain which bears the configuration

although the point of attack may be a hydrocarbon group attached to the chain. The invention here is particularly useful for cross-linking polymers derived from polymerization of unsaturated monomers via their unsaturation which are of considerable molecular weight and characteristically have a long chain carbon backbone, e.g., polyethylene, polystyrene, copolymers of ethylene and propylene and the like.

The organic monoperoxycarbonates of the type herein contemplated have the general formula:

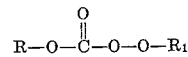

where R and $R_1$ are the same or different monovalent organic radicals, notably hydrocarbon radicals, such as aliphatic or cycloaliphatic or aromatic radicals which may be derived from a corresponding alcohol or phenol. These esters are prepared by reaction of an organic chloroformate with an organic hydroperoxide according to the methods disclosed by Strain et al., "Journal of the American Chemical Society," volume 72, page 1254 (1950), to result in the formation of O,O-alkyl O-alkyl monoperoxycarbonate or dialkyl monoperoxycarbonate when both alkyl groups are the same. Especially useful are monoperoxycarbonates such as O,O-tertiarybutyl O-isopropyl monoperoxycarbonate wherein the carbon atom adjacent to the peroxy group —O—O— is free from hydrogens.

Organic monoperoxycarbonates include those which contain from 3 to 20 carbon atoms. Specific monoperoxycarbonates include: O,O-ethyl O-methyl monoperoxycarbonate, O,O-isopropyl O-isopropyl monoperoxycarbonate, O,O-tertiarybutyl O-phenyl monoperoxycarbonate, O,O-tertiarybutyl O-benzyl monoperoxycarbonate, O,O-tertiarybutyl O,2-chloroethyl monoperoxycarbonate, O,O-ethyl O-isopropyl monoperoxycarbonate, O,O-isopropyl O-dodecyl monoperoxycarbonate, O,O-normalamyl O-dodecyl monoperoxycarbonate, and O,O-methyl O-octadecyl monoperoxycarbonate. Those which are especially preferred are the O,O-tertiaryalkyl O-alkyl monoperoxycarbonates which generally contain 6 to 10 carbon atoms, viz, O,O-tertiarylbutyl O-methyl- monoperoxycarbonate, O,O-tertiarybutyl O-ethyl monoperoxycarbonate, O,O-tertiarybutyl O-propyl monoperoxycarbonate, O,O-tertiarybutyl O-isopropyl monoperoxycarbonate, O,O-tertiarybutyl O-butyl monoperoxycarbonate, O,O-tertiarybutyl O-isobutyl monoperoxycarbonate, O,O-tertiaryamyl O-isopropyl monoperoxycarbonate, O,O-tertiaramyl O-tertiarybutyl monoperoxycarbonate, O,O-(1-methylcyclohexyl) O-isopropyl monoperoxycarbonate, O,O-phenyl O-methyl monoperoxycarbonate, O,O-metachlorophenyl O-isopropyl monoperoxycarbonate, and ditertiarybutyl monoperoxycarbonate. Aliphatic monoperoxycarbonates with a tertiary aliphatic group on the peroxygen link and in which the second aliphatic group is a normal aliphatic group generally require slightly lower cure temperatures to produce cross-linking of the polymer chains than do such compositions when both aliphatic groups are secondary or tertiary.

In the practice of one embodiment hereof, cross-linked compositions are prepared by mixing polymer with cross-linking organic monoperoxycarbonate and sulfur. Thorough mixing may be obtained by cold milling the ingredients on a rubber mill in the customary manner of cross-cutting the sample in the mill and end-for-end passes of the cut material until thoroughly blended. Alternatively, all ingredients may be dissolved in a solvent and the solution cast to form a film by evaporation of the solvent. A further alternative, where applicable, comprises mixing the powdered ingredients. Any further alternatives may be employed which produce a thorough blend of the ingredients. The resulting blends are cross-linked by heating for a length of time commensurate with the selected cross-linking temperatures. A convenient method of heating comprises placing the blended ingredients in a mold under mild pressure which is maintained during the heating period while the mold is kept at the selected temperature. Alternatively, a hot mill may be employed and in the case of film cast from solution, the solvent may be evaporated from a surface at the selected temperature. These same methods are employed for providing the compositions which contain sulfur or sulfur-contributing materials and alternatively for mixtures containing no sulfur or sulfur-containing material.

Sulfur-contributing materials which may be employed in the practice hereof, include:

Elemental sulfur
Tetramethylthiuram disulfide
Tetraethylthiuram disulfide
Tetramethylthiuram monosulfide
Tetraethylthiuram monosulfide
Tetrabutylthiuram monosulfide
Dipentamethylenethiuram tetrasulfide
2-mercaptobenzothiazole
2,2'-dithiobisbenzothiazole Sulfur-containing compounds may be used alone as a source of sulfur to provide cross-linking of the monoperoxycarbonate initiated radicals or as accelerators. Additionally, such compounds and many non-sulfur containing compounds may be used with elemental sulfur or a second sulfur containing compound as accelerators. Also, pigments such as calcium carbonate, zinc oxide, antimony sulfide, carbon black, silica, and metal silicates, such as calcium silicate, may be used as either pigments or fillers in elastomer compositions with organic dyes without departing from the spirit of the invention described herein.

The amount of monoperoxycarbonate employed in the practice hereof may be varied between wide extremes and is related in a particular example to the molecular weight and structure of the percarbonate. Variation in the amount of organic percarbonate utilized will also depend on the particular polymer which is treated. The preferred type, O,O-tertiaryalkyl O-alkyl monoperoxycarbonate, notably O,O-tertiarybutyl O-isopropyl monoperoxycarbonate, may be employed in an amount as little as one percent monoperoxycarbonate by weight of polymer, such as propylene, or as much as twenty percent by weight of saturated polymer, such as polypropylene. The preferred amount may vary from 2.0 to 10.0 percent of monoperoxycarbonate by weight of saturated polymer, such as polypropylene. Amounts less than 2.0 percent of monoperoxycarbonate by weight of saturated polymer, such as polypropylene, however, may be used, especially when the extent of desired cross-linking is low. Amounts greater than 10 percent of monoperoxycarbonate by weight of saturated polymer, such as polypropylene, generally produce no increase in the fraction of the polymer which is cross-linked and may in some instances degrade a portion of the polymer.

While cross-linking may be obtained by merely heating the polymer with monoperoxycarbonate, it is preferred in accordance with this invention to employ a small amount of elemental sulfur, usually from 10 percent of the monoperoxycarbonate up to 100 percent of the monoperoxycarbonate by weight of sulfur. Thus, when 3 percent of monoperoxycarbonate by weight of saturated polymer, such as polypropylene, is employed for cross-linking it is desired that from 0.3 to 3.0 percent of sulfur by weight of saturated polymer is utilized. Sulfur-containing materials, such as tetramethylthiuram disulfide are employed in a chemical equivalent amount which provides from 10 percent to 100 percent of the monoperoxycarbonate by weight of available sulfur.

Typical temperatures at which cross-linking occurs are greater than 80° C., usually at least 100° C., but rarely exceed 200° C. Operation at lower temperatures is possible, but usually entail extending considerably the time of cure. Temperatures below 100° C. usually, for example, require 2 hours or more to cross-link sufficient polymer, while temperatures above 200° C. have a tendency with many polymers to overcure or to cure more rapidly than is desirable. With the preferred O,O-tertiarylalkyl O-alkyl monoperoxycarbonates, a temperature within the range of 110 to 160° C. for from one hour to as little as 10 minutes will produce satisfactory cross-linking.

Thus, cross-linking of high molecular weight polymers such as synthetic elastomeric polymers, such as provided by copolymerization of ethylene and propylene, may be accomplished pursuant to this invention by mixing the rubbery polymer with the monoperoxycarbonate (and such other recipe ingredients as may be desired, such as elemental sulfur) at temperatures below the activation temperature of the carbonate, usually above 15° C. up to about 60° C. or slightly higher, but rarely in excess of 80° C. Effective compounding may thus be achieved before any significant cross-linking or curing occurs at the convenient temperatures despite the presence of the carbonate. Thereafter, the composition is raised to a temperature above the carbonate activation temperature and curing or cross-linking achieved at a controlled rate. Usually the curing is above 80° C. and generally in the range of 100° C. to 200° C.

The amount of cross-linking obtained is generally measured by swelling a sample of the cross-linked or cured polymer in a solvent, such as benzene, in which the material which is not cross-linked is soluble. The cured polymer swells until equilibrium is reached, usually in about 5 days. The resulting swollen polymer or gel is then analyzed for the volume fraction of "rubber" by evaporation of the solvent from a weighed sample. By calculation from the weight of the non-volatile portion and the density of both the polymer and the solvent the volume fraction is obtained. This parameter is used as a measure of the efficiency of a given cross-linking material.

The following examples illustrate the manner in which this invention may be practiced.

EXAMPLE I

Gel-free copolymer of ethylene and propylene was prepared by: (a) dissolving in benzene the commercial polymer supplied by Montecatini under the trade name of Dutral N; (b) filtering to remove the small amount of gel present; and (c) evaporating the benzene to recover purified polymer.

To dried, purified polymer which was blended on a rubber mill, was added 3 parts by weight of monoperoxycarbonate per hundred parts by weight of polymer. In addition, samples were prepared which also contained 0.5 part of sulfur by weight per hundred parts of polymer by weight. These samples were blended by cross-cutting and end-for-end passes on the mill. Cross-linking was achieved by heating for various times in a closed mold. After cross-linking, samples were swollen to equilibrium swelling in benzene (5 days) and the ratio of gelled material to soluble material determined. A sample of separated gelled material was also used to determine the ratio of unsolvated cross-linked material to total solvated gel from which the standard parameter of volume ratio of cross-linked unswollen material to solvated gel was calculated. This standard parameter is a measure of degree of cross-linking (Flory, "Principles of Polymer Chemistry," pages 576 to 580; "Cross-Linking in Natural Rubber Vulcanizates," Adams and Johnson, "Industrial and Engineering Chemistry," volume 45, pages 1539 to 1546 (1953)).

In Table I it is shown that O,O-tertiarybutyl O-isopropyl monoperoxycarbonate produces better cross-linking than dicumyl peroxide while resulting in a cured product having acceptable odor, whereas dicumyl peroxide results in a highly odiferous cured product.

TABLE I.—CROSS-LINKING OF ETHYLENE-PROPYLENE COPOLYMER AT 140° C.

| Experiment | Cross-Linker | Time, Minutes | Gel/Sol [3] | Polymer [4]/ Gel | Odor |
| --- | --- | --- | --- | --- | --- |
| A | BIPC [1] | 30 | 0.82 | 0.28 | Satisfactory. |
| B | BIPC | 60 | 0.83 | 0.29 | Do. |
| C | Di-Cu [2] | 30 | 0.80 | 0.24 | Vile. |
| D | Di-Cu | 60 | 0.83 | 0.25 | Do. |
| E | BIPC (No S) | 60 | 0.86 | 0.26 | Satisfactory. |

[1] O,O-tertiarybutyl O-isopropyl peroxycarbonate.
[2] Dicumyl peroxide.
[3] Weight ratio of gel to soluble material and cross-linked material.
[4] Volume ratio of cross-linked unswollen polymer to solvated gel.

EXAMPLE II

Copolymer of ethylene and propylene (Dutral N as in Example I) was cured without first purifying. The samples were prepared by milling as in Example I and were cross-linked by heating at specific temperatures shown in Table II, while under pressure in an electrically heated mold. The pressure applied was approximately 16,890 pounds per square inch in a mold 1.5 inches square, having a molding thickness of 0.015 inch. Equilibrium swelling after one week was determined in carbon tetrachloride. In Table II a comparison on an equivalent basis is shown of the cross-linking efficiency of dicumyl peroxide with that of O,O-tertiarybutyl O-isopropyl monoperoxycarbonate at various temperatures. Thus, a concentration of 4 parts of dicumyl peroxide per 100 parts by weight of polymer was compared with 2.6 parts of O,O-tertiarybutyl O-isopropyl monoperoxycarbonate per 100 parts by weight of polymer, each composition containing sulfur at the rate of 0.5 grams per 100 grams of original polymer. This same data in graphical form (FIGURE 1) shows the superiority of the monoperoxycarbonate for low temperature cross-linking. FIGURE 1 also indicates that even less than the equivalent weight of O,O-tertiarybutyl O-isopropyl monoperoxycarbonate might be employed to produce, in a given time, a cure equivalent to that produced by dicumyl peroxide.

TABLE II.—CROSS-LINKING OF ETHYLENE-PROPYLENE COPOLYMER WITH O,O-TERTIARYBUTYL ISOPROPYL MONOPEROXYCARBONATE AT VARIOUS TEMERATURES

| Experiment | Temp., ° C. | Time, Minutes | Gel/Sol [1] | Polymer [2]/Gel | Odor |
| --- | --- | --- | --- | --- | --- |
| F | 120 | 60 | 0.80 | 0.15 | Satisfactory. |
|   |     | 120 | 0.80 | 0.15 | Satisfactory. |
| G | 140 | 15 | 0.79 | 0.15 | Satisfactory. |
|   |     | 30 | 0.82 | 0.16 | Satisfactory. |
|   |     | 60 | 0.82 | 0.16 | Satisfactory. |
|   |     | 120 | 0.81 | 0.16 | Satisfactory. |
| H | 160 | 7.5 | 0.83 | 0.16 | Satisfactory. |
|   |     | 15 | 0.83 | 0.17 | Satisfactory. |
| I (No S) | 160 | 15 | 0.80 | 0.16 | Satisfactory. |
| Dicumyl Peroxide | | | | | |
| J | 120 | 60 | 0.58 | 0.08 | Vile. |
|   |     | 120 | 0.70 | 0.11 | Vile. |
| K | 140 | 15 | 0.55 | 0.07 | Vile. |
|   |     | 30 | 0.64 | 0.09 | Vile. |
|   |     | 60 | 0.76 | 0.14 | Vile. |
|   |     | 120 | 0.82 | 0.17 | Vile. |
| L | 160 | 7.5 | 0.74 | 0.12 | Vile. |

[1] Weight ratio of gel to soluble material and cross-linked materials;
[2] Volume ratio of cross-linked unswollen polymer to solvated gel.

EXAMPLE III

A sample of 100 grams of polyethylene having a melting point of 110° C., 2.6 grams of O,O-tertiarybutyl O-methyl monoperoxycarbonate; and 0.5 gram of sulfur, may be milled at 120° C. for 5 minutes and cured at 140° C. for 2 hours to produce a cross-linked polymer having approximately 0.12 polymer to gel ratio in the equilibrium swelled polymer (5 days in chloroform). No vile or obnoxious odor could be detected.

EXAMPLE IV

In lieu of sulfur in Example III, thiuram sulfides may be employed to aid in cross-linking polyethylene. Thus, 100 grams of polyethylene, melting point 110° C., 2.6 grams of O,O-tertiarybutyl O-methyl monoperoxycarbonate and 1.3 grams of tetramethylthiuram disulfide may be milled together for 5 minutes at 120° C. and maintained at 140° C. for 2 hours to yield a chloroform insoluble elastomer with no vile odor. A similar chloroform insoluble elastomer may be obtained by employing 0.5 gram of dipentamethylene thiuram disulfide.

EXAMPLE V

A liquid silicone polymer (dimethyl fluid) having a viscosity of 50 centistokes at 25° C. is readily cross-linked by dissolving 0.3 gram of O,O-tertiarybutyl O-isopropyl monoperoxycarbonate in 10 grams of polymer. After about one hour at 140° C. it is observed that the liquid mixture has become a rubber-like polymer.

EXAMPLE VI (Cross-linking polymer films)

Solutions of polyurethane resin (polyethylene glycol, molecular weight 400, reacted on a 1:1 mole basis with toluene diisocyanate), polypropylene oxide resin, poly(methyl methacrylate) resin and butene-1 polymer containing about 10 percent by weight in benzene, dioxane, benzene and heptane, respectively, may be treated with O,O-tertiarybutyl O-isopropyl monoperoxycarbonate to produce film by casting the solution. In each case the films may be cured at 140° C. for 1 hour. Cross-linking is observed as follows:

| Resin Cured | Test in— | Result, 5 Days in Solvent |
| --- | --- | --- |
| Polyurethane | Benzene | Slightly swollen. |
| Polypropylene oxide | Dioxane | Swollen considerably. |
|   | Ethanol | Do. |
| Poly(methyl methacrylate) | Benzene | Swollen, rubbery. |
|   | Heptane | Do. |
| Polybutene | Benzene | Do. |

EXAMPLE VII

A sample of butadiene-styrene copolymer (prepared by copolymerizing 75 weight percent butadiene and 25 weight percent styrene mixture) is milled at 120° C. with 2.6 grams of O,O-tertiary O-isopropyl monoperoxycarbonate per 100 grams of copolymer for 15 minutes. After a cure treatment of 1 hour at 150° C. in an oven, the sample was virtually insoluble in benzene.

EXAMPLE VIII

Typical synthetic rubber recipes curable by heating in the presence of monoperoxycarbonate are:

| | Parts by weight |
| --- | --- |
| Butyl rubber (a copolymer of 97.5 percent isobutylene and 2.5 percent isoprene) | 100 |
| Silica filler [1] | 39 |
| O,O-tertiarybutyl O-isopropyl monoperoxycarbonate | 2 |
| p-Quinone dioxime | 0.25 |
| Hycar (acrylonitrile-butadiene copolymer) | 100 |
| Silica filler [1] | 39 |
| O,O-tertiarybutyl O-isopropyl monoperoxycarbonate | 1.25 |
| Trimene base | 1.00 |
| Stearic Acid | 0.5 |

[1] A finely divided precipitated silica, especially effective in reinforcing rubbers, such as Hi-Sil 233, a product manufactured and sold by Pittsburgh Plate Glass Company.

In lieu of O,O-tertiarybutyl O-isopropyl monoperoxycarbonate other monoperoxycarbonates, such as hereinbefore specified, may be employed in the foregoing examples.

The products of the instant invention have numerous applications in molding and may be milled with appropriate fillers, dyes, antioxidants, and other inert chemicals to produce molded products having great flexibility.

While the invention has been described with reference to the details of certain specific embodiments, it is not intended that the invention be limited thereto except insofar as may appear in the following claims.

I claim:

1. In the cross-linking of organic polymer, the improvement which comprises mixing the polymer with an organic monoperoxycarbonate in the presence of a sulfur-contributing material until cross-linking occurs to the activation temperature of the peroxycarbonate until cross-linking occurs.

2. The process of claim 1 wherein the monoperoxycarbonate is O,O-tertiaryalkyl O-alkyl monoperoxycarbonate.

3. The process of claim 1 wherein the monoperoxycarbonate is O,O-tertiarybutyl O-isopropyl monoperoxycarbonate.

4. A process for cross-linking solid polymer of an organic unsaturated monomer which comprises mixing said solid polymer with from 1 to 10 weight percent of monoperoxycarbonate having from 3 to 20 carbon atoms and heating the resulting mixture to a temperature of at least 80° C. in the presence of a sulfur-contributing material until cross-linking occurs.

5. The process of claim 4 wherein the monoperoxycarbonate is O,O-tertiarybutyl isopropyl monoperoxycarbonate.

6. The process of claim 4 wherein the polymer is polyethylene.

7. The process of claim 4 wherein the polymer is copolymer of ethylene and propylene.

8. The process of claim 1 wherein the solid, organic polymer is butadiene-styrene resin.

9. A method of producing cross-linked polymer which comprises milling solid, organic polymer with monoperoxycarbonate below the activation temperature of the monoperoxycarbonate and thereafter heating the resulting milled mixture up to 200° C. in the presence of a sulfur-contributing material above the activation temperature of the monoperoxycarbonate until cross-linking occurs.

10. The process of claim 9 wherein the polymer is copolymer of ethylene and propylene.

11. The process of claim 9 wherein the monoperoxycarbonate is O,O-tertiarybutyl O-isopropyl monoperoxycarbonate and wherein the sulfur-contributing material is elemental sulfur.

12. The method of claim 9 wherein the amount of sulfur-contributing material is from 10 to 100 percent available sulfur by weight of the monoperoxycarbonate milled with the polymer.

References Cited

UNITED STATES PATENTS

| | | | |
|---|---|---|---|
| 2,374,789 | 5/1945 | Strain | 260—94.9 |
| 2,903,440 | 9/1959 | Heiligmann | 260—83.7 X |
| 3,012,016 | 12/1961 | Kirk et al. | 260—79.5 |
| 3,012,020 | 12/1961 | Kirk et al. | 260—88.2 |

JOSEPH L. SCHOFER, *Primary Examiner.*

D. K. DENEBERG, *Assistant Examiner.*